United States Patent [19]
Swett et al.

[11] 3,820,692
[45] June 28, 1974

[54] FOOD SHAKER AND BLENDER

[75] Inventors: James B. Swett, Barrington, R.I.;
Sidney Z. Smith, Worcester, Mass.

[73] Assignee: Dart Industries Inc., Los Angeles, Calif.

[22] Filed: Apr. 16, 1973

[21] Appl. No.: 351,697

[52] U.S. Cl. .......................... 222/547, 259/DIG. 23
[51] Int. Cl. ............................................. B65d 1/02
[58] Field of Search ............... 220/1 E; 222/547; 259/DIG. 23, 72

[56] References Cited
UNITED STATES PATENTS

| | | | |
|---|---|---|---|
| 1,878,924 | 9/1932 | Will | 220/1 E |
| 2,752,971 | 7/1956 | Tupper | 220/1 E X |
| 3,341,089 | 9/1967 | Pearsall | 220/1 E |

Primary Examiner—Stanley H. Tollberg
Assistant Examiner—Norman L. Stack, Jr.
Attorney, Agent, or Firm—Leigh B. Taylor

[57] ABSTRACT

A food storage receptacle or vessel and blender having an overall shape or configuration that is functional to direct fluid flow patterns therein and effect maximum mixing characteristics thereby. In addition to the noted container configuration there is also included therein a removable blending element also of a prescribed configuration that further maximizes fluid mixing action as the receptacle is shaken in use.

2 Claims, 7 Drawing Figures

PATENTED JUN 28 1974

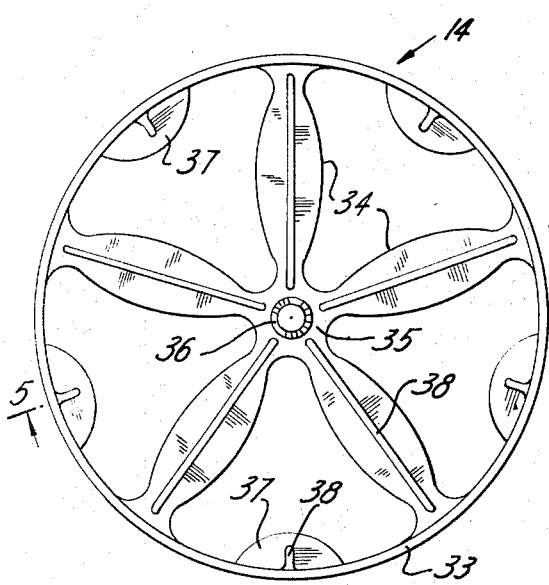
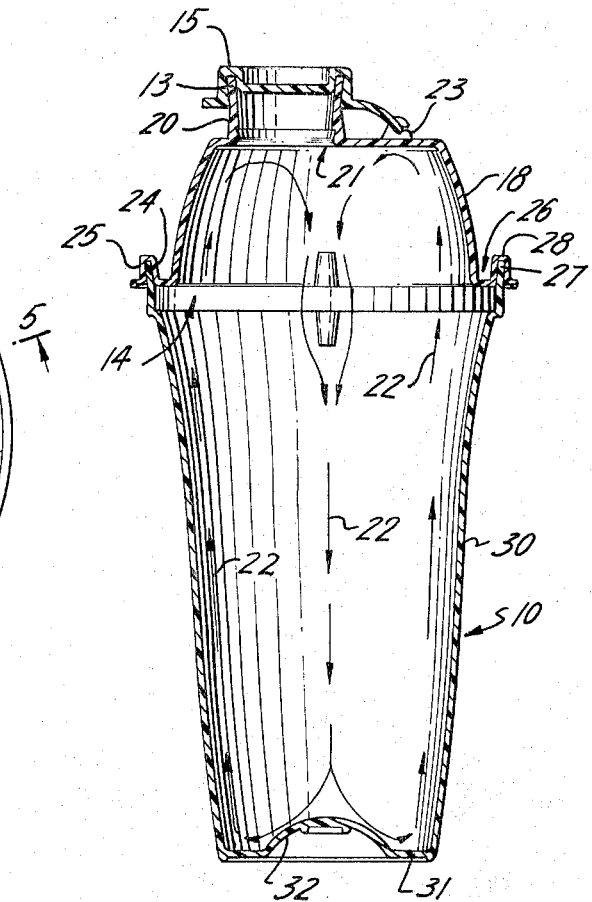
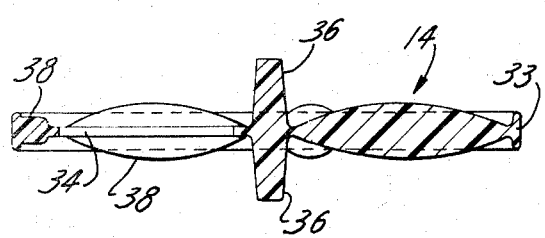
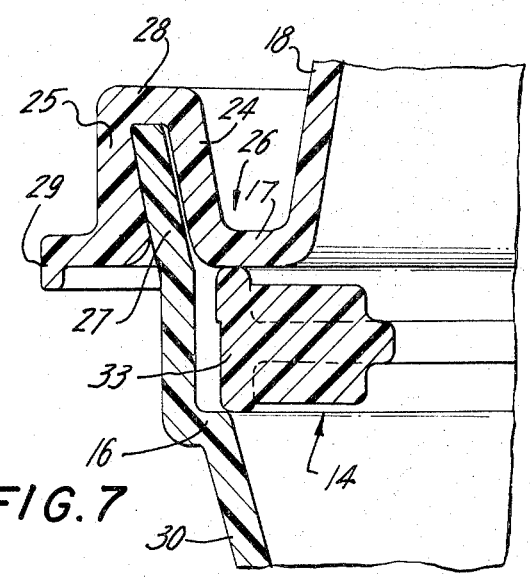

FOOD SHAKER AND BLENDER

This invention relates generally to household receptacles, but more specifically to an assembly of parts and the whole thereof being capable of serving many functions including use as a dispenser, a beverage shaker, a fluid receiver, a tumbler and the like.

Essentially, the assembly comprises a closure member of polyethylene or other plastic having similar physical properties and a receiving container member. The closure member has an elevated central wall portion to increase the capacity thereof and a peripherally grooved edge to engage the rim of the container member in a seal-tight relationship. The container member, furthermore, is preferably, but not exclusively also made of polyethylene or other plastic having similar physical properties.

Accordingly, the main object of the invention resides in the provision of structure for many selective uses as a beverage shaker and dispenser, a dispensing device, a food or fluid package and the like. In effecting such objective the closure and container include specially shaped bottom and top walls to create the desired fluid flow pattern therein. Furthermore, the assembly includes a blending element positioned adjacent the top of the container. Such element assures the complete mixing of container fluids as it passes over and around same upon shaking the assembly.

A further object of the invention resides in the provision of a device of the above nature wherein the capacity of the container member is increased when the closure is applied thereto in seal tight relationship for storage, packaging and dispensing purposes, the said closure member being provided with an opening in the top wall and an associated seal therefor.

The structure described, and as a further feature of the invention herein, is capable, by reason of resiliency and local distortability of the material, of being under a partial vacuum when in a closed position thereby enabling increased sealing engagement between the closure member top wall opening and seal therefor.

Other incidental features of the invention will hereinafter appear in the progress of the disclosure, the appended claims and drawings wherein:

FIG. 4 is a top plan view of the blending element;

FIG. 5 is a sectional view substantially along the axis line 5—5 of the assembled device shown in FIG. 2;

FIG. 6 is a sectional view of the blending element taken along line 6—6 of FIG. 4;

FIG. 7 is an exploded partial cross-sectional view of the blending element and closure assembled upon the container.

Figure 1:
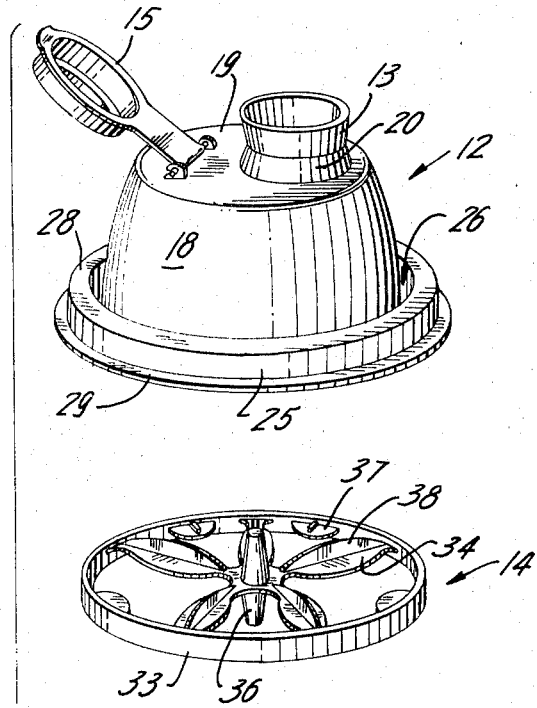
FIG. 1 is an exploded view in perspective of the device showing a spout and seal therefor forming part of the closure member, the latter being attachable to the container member.
Figure 2:
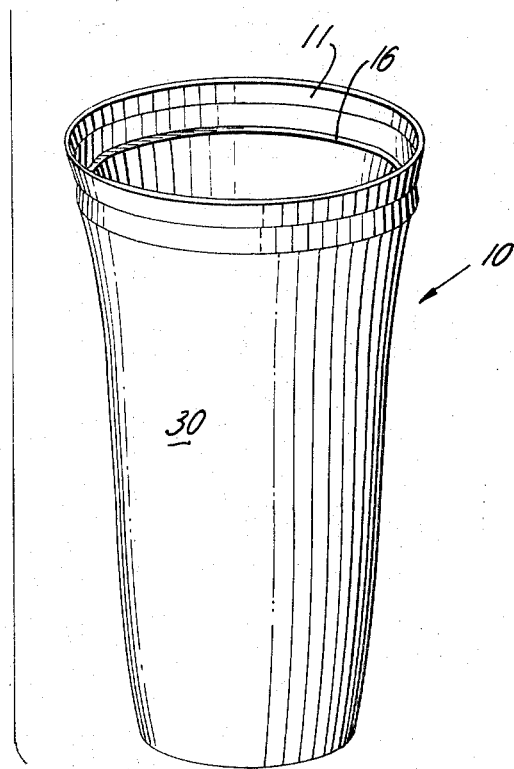
FIG. 2 is a side view of the device assembled.
Figure 2:
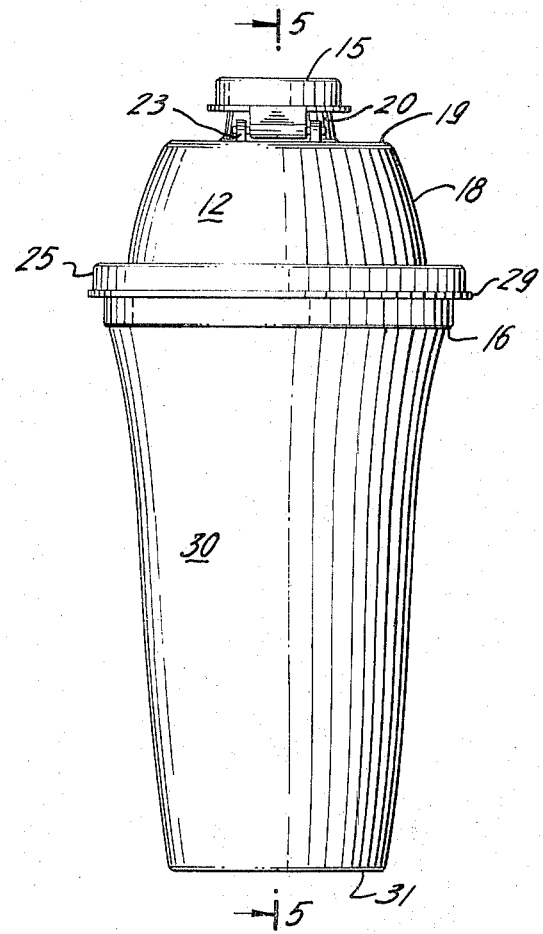
Figure 3:
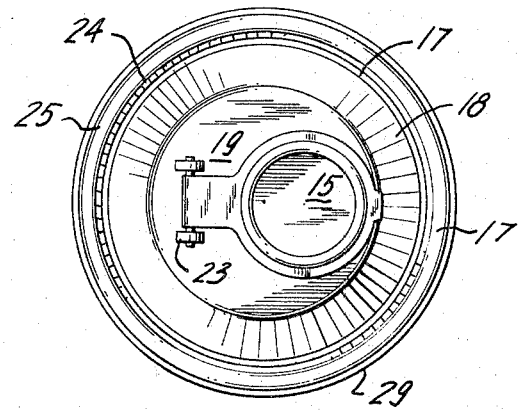
FIG. 3 is a top plan view of the closure.

In a preferred form of the invention, FIGS. 1–5 show a vessel 10 used as a tumbler or container member, being provided with a flared edge or rim 11 and constituting the lower half of the fluid or other media receiving compartment of the device. Vessel 10 is preferably made of an unbreakable material such as the aforementioned polyethylene or similar material to augment sealability with a closure member 12. The closure member 12 for vessel 10 and as seen in FIGS. 1–3, 5 and 7 has a four-fold function: namely as a removable, seal-tight closure for vessel or tumbler 10; secondly, as a capacity booster therefor; thirdly as an auxiliary feed mouth and dispensing spout for the vessel when the closure member 12 is in seal-tight engagement therewith; and fourthly to retain the blending element 14 in a substantially fixed position in the assembly.

Where the device is used as a beverage or other food shaker, closure member 12 is removed, the ingredients added to vessel 10, the closure applied at its grooved sealing edge to the vessel rim 11 and finally the spout 13 is covered by a cap 15. Of course, prior to replacing the closure member 12 the blending element 14 is positioned in the vessel on ledge 16. This element is thereafter securely retained in this position due to the engagement therewith of the annular wall 17 of closure 12 as may best be seen in FIGS. 5 and 7. The device is then shaken and thereafter the spout seal is removed and the device serves as a dispenser of any type of the mixed liquid food drink such as malted milk and mixtures used for baking.

Closure member 12, molded or formed from polyethylene or other material having similar physical characteristics, is of any desirable shape and size but as shown is round in any cross-section, and comprises a continuous dome-like side wall 18 terminating in a top wall 19, the latter having a reduced feed and spout functioning neck 20 communicating with an opening 21 in the top wall. Neck 20 is provided with a seal of any desirable type.

The seal for the spout or neck 20 as shown in FIG. 1 cooperates with the flared peripheral spout 13 and is comprised of a conventional cap-like member 15 suitably removably attached to closure top wall 19, as by hinge pivots 23.

Continuing, spaced and integral with the lower edge of side wall 18 of closure 12 is an upwardly disposed and grooved peripheral rim having inner and outer walls 24 and 25, the inner wall being spaced from closure side wall 18 by a concentric well 26 including annular wall 17. The closure member side wall 18 is smoothly curved inwardly in its progression toward top wall 19 to generate the dome-like configuration mentioned above. This feature is accentuated by the fact that the container or vessel 10 is specially shaped and these together produce a fluid flow pattern that directs fluid in the vicinity of the assembly side walls back toward the center thereof. This likewise creates a maximum of agitation as the fluid passes over the differently shaped areas of blending element 14 which is discussed more fully hereinbelow.

Closure member 12 is applied to the vessel 10 at the flared portion 27 by hand conformation along the axis of the grooved rim top wall 28 and is removable therefrom by a peeling off type of procedure, namely by applying the forefinger to top wall 19 and the thumb under the flared portion 29.

Sealing is effected between the upper part of the inside of the outer defining wall 25 and the inside of the connecting wall 28 relative to the vessel mouth or rim 27 where the lateral dimension of the inside of the outer groove wall 25 is less than the outside diameter or lateral dimension of vessel flared portion 27 as most clearly illustrated in FIG. 7, all owing to resiliency of the groove walls 24, 25 and 28.

As is discussed above and is most apparent from FIG. 5, the vessel 10 includes a side wall structure 30 that approximates a bell-shape the open-end of which terminates with the flared portion or rim 27. Likewise, the integral vessel bottom wall 31 includes a center positioned internally projecting hemispherical portion 32. This portion acts to direct fluids in the central area of the vessel outwardly towards the side walls 30. Such is, of course, contrary to the flow pattern spoken of above that is generated by the closure member 12. Accordingly, as the assembly is shaken in use, an approximate fluid flow pattern is created as is shown in FIG. 5 by arrows 22. This assures a maximum mixing in that with such a basic pattern virtually all of the contained fluid will be subjected to various eddy flow patterns as it passes over the differing areas of the blending element 14.

Blending element 14, best depicted in FIGS. 4 and 6 includes an annular ring member 33 which is of a diameter approximating that of the vessel 10 in the area of ledge 16. Thus as indicated, such member is positionable on that ledge and is retained there by annular wall 17 of closure 12 (FIG. 7). This element further includes a plurality of spokes 34 which emanate from a hub 35. The latter, hub 35, further includes projections 36, one each, extending in opposite directions therefrom. These serve as handle means that the user may employ in the removal and insertion of the blending element.

In addition to spokes 34 annular ring 33 also has as an integral part thereof a plurality of inwardly projecting hemispherical paddles 37. These are spaced intermediate the points of attachment of the spokes with the ring and, of course, tend to disrupt any flow of fluid along or in the area of the walls of the assembly to generate a maximum mixing action with a minimum of obstruction to fluid passing through element 14. Likewise, spokes 34 are of a tear-drop shape thereby presenting a maximum transverse exposure to contained fluids at their approximate center. This also therefore will combine maximum mixing with minimum obstruction. Each of these elements spokes 34 and paddles 37 are further reinforced by ribs 38 which extend both vertically above and below same. The ribs 38 which are a part of the spokes are of a similar shape as is evident in FIG. 6.

I wish it understood that minor changes and variations in the material, integration, location, size and shape of parts may all be resorted to without departing from the spirit of the invention and the scope of the appended claims.

We claim:

1. A household receptacle and closure for selective use as a beverage shaker or a dispenser, comprising a lower vessel having an open mouth and a mouth rim, a disengageable closure having a relatively large volumetric capacity and having a complimentary mouth adapted to engage the mouth of the lower vessel and to augment the capacity thereof and having a laterally offset upwardly extending peripheral groove extending from the mouth of said closure vessel, the outer wall of said groove having a smaller inner diameter than the outer diameter of the mouth rim of the lower vessel, said groove being removably engageable at the outer wall thereof with said lower vessel mouth rim for seal-tight and yieldable engagement therewith, said closure vessel including an inwardly sloping sidewall structure of a dome-like configuration and having on one wall a filling and pouring spout and a removable closure therefor, said lower vessel having adjacent said open mouth a ledge formed on the bell-shaped sidewall thereof and further including in an integral bottom wall having a center positioned internally projecting portion, and a removable blending element having an annular ring positioned on said ledge and further being contacted by said closure, said element also having a plurality of radiating spokes and paddles said paddles being attached only at said annular ring and being positioned intermediate the spokes therearound.

2. The household receptacle or shaker according to claim 1 wherein said spokes of the blending element are of a tear-drop shape and said paddles thereon are inwardly directed hemispherically shaped projections.

* * * * *